UNITED STATES PATENT OFFICE.

JOSEPH WARREN WATTLES, OF CANTON, MASSACHUSETTS.

COMPOSITION FOR SIZING YARN.

SPECIFICATION forming part of Letters Patent No. 292,269, dated January 22, 1884.

Application filed June 20, 1883. (No specimens.)

*To all whom it may concern:*

Be it known that I, JOSEPH WARREN WATTLES, of Canton, in the county of Norfolk, of the Commonwealth of Massachusetts, have invented a new and useful Improvement in Compositions for Sizing Yarn; and I do hereby declare the same to be described as follows:

My present invention relates, especially, to those described in the United States Patents Nos. 168,435 and 172,216, granted to me, one of such patents covering a liquid and the other a dry composition of starch and acetic acid.

My present invention is a composition of starch, acetic acid, and a fat or oil, or matter of a greasy or oily nature. I prefer to use an animal oil or fat; but in some cases a mineral or vegetable oil may be used to advantage.

The composition may be composed of two parts, by weight, of starch, one part, by weight, of acetic acid, and one part, by weight, of the grease, lard or lard-oil. These are to be heated and thoroughly mixed or combined together, water being used in sufficient quantity when it may be desirable to render the composition sufficiently liquid for use; but the water may be used by the yarn-dresser before using the composition in the dressing-machine.

The addition of oil or grease to the acid and starch produces a composition which is particularly valuable for sizing woolen yarn, though applicable to advantage to other kinds of yarn.

The yarn dressed with the composition works better in the loom, will not readily mildew, and is less liable to fermentation than is a dressing of acetic acid and starch alone. It can be used in a wet or damp state, and when dry will not easily separate from the yarn.

I do not intend to confine my yarn dressing or sizing composition to the precise proportions of its ingredients as hereinbefore stated, for such may be somewhat varied without materially affecting the character or utility of the composition.

I do not herein claim a yarn-dressing consisting of starch and acetic acid, or such and water, having claimed such in liquid and dry states in the aforementioned patents.

I claim—

A yarn sizing or dressing, substantially as described, composed of acetic acid, starch, and grease or oil, mixed or combined essentially as set forth.

JOSEPH WARREN WATTLES.

Witnesses:
R. H. EDDY,
E. B. PRATT.